G. H. JONES.
VEHICLE FRAME.
APPLICATION FILED MAR. 17, 1910.
1,053,824.
Patented Feb. 18, 1913.
2 SHEETS—SHEET 1.
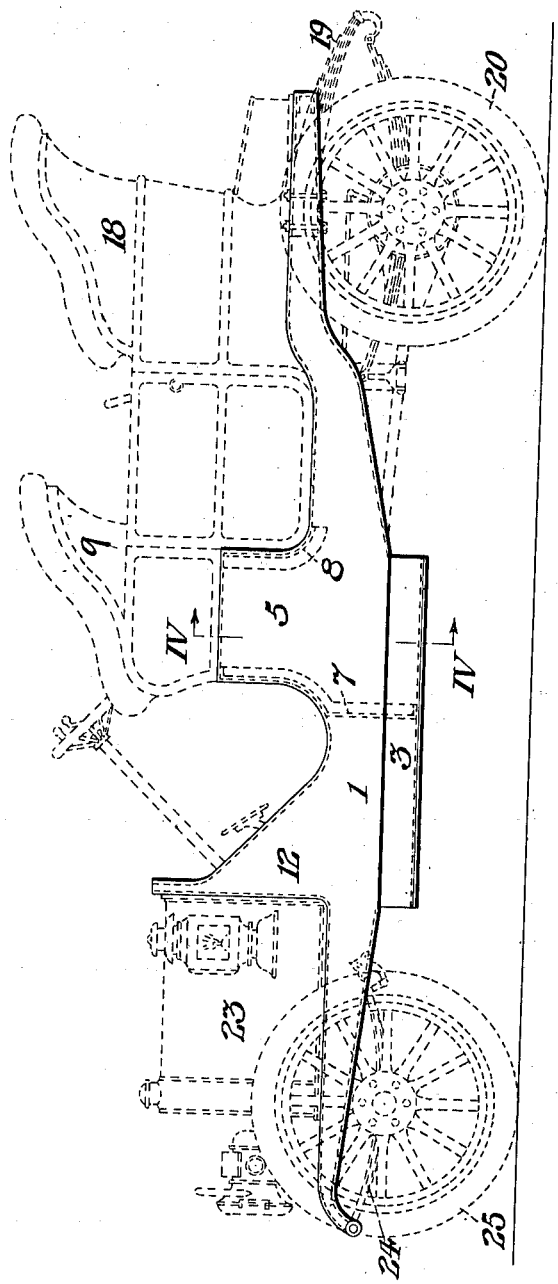
WITNESSES:
Philip W. Vessey.
Raymond Betts.
INVENTOR:
GEORGE HILL JONES,
by Arthur E. Paige
Atty.

G. H. JONES.
VEHICLE FRAME.
APPLICATION FILED MAR. 17, 1910.
1,053,824.
Patented Feb. 18, 1913.
2 SHEETS—SHEET 2.
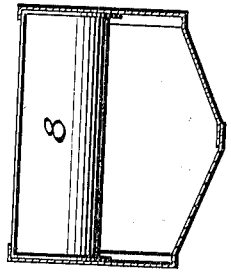
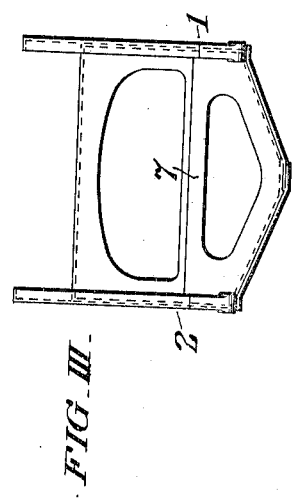
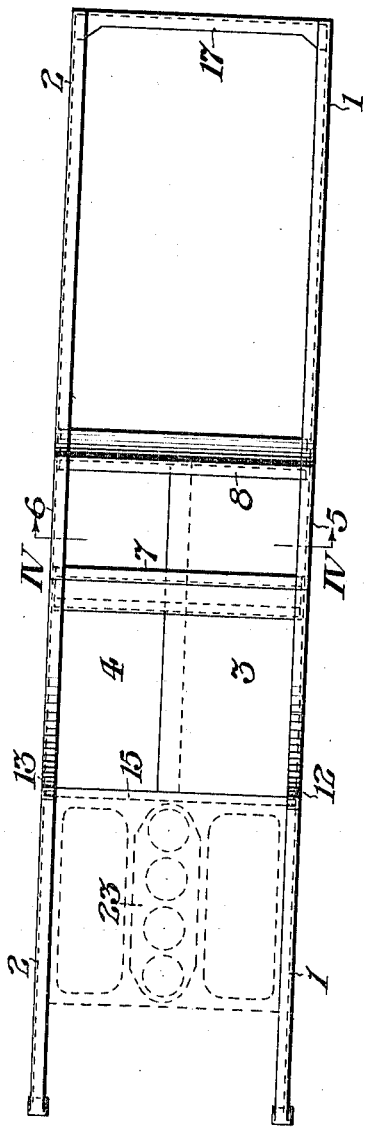
WITNESSES:
Philip W. Vessey.
Raymond Betts.
INVENTOR:
GEORGE HILL JONES,
by Arthur E. Paige,
Atty.

UNITED STATES PATENT OFFICE.

GEORGE HILL JONES, OF ALDAN, PENNSYLVANIA.

VEHICLE-FRAME.

1,053,824. Specification of Letters Patent. Patented Feb. 18, 1913.

Application filed March 17, 1910. Serial No. 549,895.

*To all whom it may concern:*

Be it known that I, GEORGE HILL JONES, of Aldan, in the State of Pennsylvania, have invented a certain new and useful Improvement in Vehicle-Frames, whereof the following is a specification, reference being had to the accompanying drawings.

My improvement relates to vehicle frames formed of pressed sheet metal and is particularly adapted to the manufacture of automobile frames.

As hereinafter described, my invention includes a frame formed of two sheets of metal respectively constituting opposite longitudinal trusses having unitary depending and inwardly projecting flanges rigidly connected together to form a transverse floor or dust guard. Said opposite trusses are transversely braced by webs forming a support for a front seat, and have front and rear extensions respectively carrying the vehicle supporting wheel springs; said front extensions supporting the motor and said rear extensions supporting the rear seat.

My invention includes the various novel features of construction and arrangement hereinafter more definitely specified.

In the drawings:—Figure I is a side view of an automobile frame conveniently embodying my improvement. Fig. II is a plan view of said frame. Fig. III is a front view of said frame. Fig. IV is a transverse sectional view, taken on the line IV—IV in Figs. I and II.

In said figures; the opposite longitudinal trusses 1 and 2 are formed of respective unitary sheets of metal having unitary flanges 3 and 4 depending and projecting inwardly, and rigidly connected to form a dust guard. The vertical extensions 5 and 6 of the respective side members aforesaid are transversely connected by the truss webs 7 and 8 and support the front seat 9. The vertical extensions 12 and 13 are adapted to receive and support between them the front dash web 15. The transverse truss 17 rigidly connects the rear extensions of said longitudinal trusses which support the rear seat 18 and carry the springs 19 which are connected with the supporting wheels 20. The front extensions of said trusses 1 and 2 support the motor 23 and the mechanism connected therewith and carry the springs 24 which are connected with the front supporting wheels 25.

It may be observed that a frame constructed and arranged as above described is much less costly, both as to materials and labor required, than an ordinary automobile frame which is built up of separate members riveted or bolted together. However, it is to be understood that I do not desire to limit my invention to vehicles of that type, or to the precise details of construction and arrangement herein set forth, as various modifications may be made therein without departing from the essential features of my invention defined in the appended claims.

I claim:—

1. A vehicle frame including two sheets of metal pressed to form opposite longitudinal trusses, having unitary flanges rigidly connected together between said trusses and unitary vertical extensions on said trusses including a support for a front dash web; transverse truss webs rigidly connecting opposite vertical extensions on said longitudinal trusses, forming a seat support; and, a transverse truss connecting the rear ends of said longitudinal trusses.

2. A vehicle frame including two sheets of metal pressed to form opposite longitudinal trusses, having unitary flanges directly rigidly connected together between said trusses and unitary vertical extensions on said trusses including a support for a front dash web; and, a transverse truss connecting the rear ends of said longitudinal trusses.

3. A vehicle frame including two sheets of metal pressed to form opposite longitudinal trusses, having unitary flanges directly rigidly connected together between said trusses and unitary vertical extensions on said trusses projecting above the latter; transverse truss webs rigidly connecting said opposite vertical extensions on said longitudinal trusses, forming a seat support; and, a transverse truss connecting the rear ends of said longitudinal trusses.

4. A vehicle frame including two sheets of metal pressed to form opposite longitudinal trusses, having flanges in respective unitary relation with said sheets directly rigidly connected together between said trusses forming a continuous floor transversely connecting said trusses.

5. A vehicle frame including two sheets of metal pressed to form opposite longitudinal trusses having inwardly extending horizontal flanges; the lower flanges on said trusses meeting and forming a continuous floor extending transversely between said trusses; and, transverse trusses distinct from said longitudinal trusses, connecting the latter independently of said floor flanges.

6. A vehicle frame including two sheets of metal pressed to form opposite longitudinal trusses, having unitary flanges directly rigidly connected together between said trusses and forming a continuous imperforate floor extending transversely between said trusses; said trusses having unitary vertical extensions including a support for a front dash web; and, a transverse truss connecting the rear ends of said longitudinal trusses, independently of said floor flanges.

In testimony whereof, I have hereunto signed my name at Philadelphia, Pennsylvania, this twenty-fourth day of February 1910.

GEORGE HILL JONES.

Witnesses:
 ARTHUR E. PAIGE,
 GERTRUDE N. R. MATTSON.